(12) United States Patent
Ralvert

(10) Patent No.: US 8,101,090 B2
(45) Date of Patent: Jan. 24, 2012

(54) DEVICE AND METHOD FOR CLEANING A FILTER CLOTH

(75) Inventor: Ake Ralvert, Hassleholm (SE)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 303 days.

(21) Appl. No.: 12/527,798

(22) PCT Filed: Feb. 21, 2008

(86) PCT No.: PCT/SE2008/000140
§ 371 (c)(1),
(2), (4) Date: Oct. 7, 2009

(87) PCT Pub. No.: WO2008/103106
PCT Pub. Date: Aug. 28, 2008

(65) Prior Publication Data
US 2010/0032388 A1 Feb. 11, 2010

(30) Foreign Application Priority Data
Feb. 21, 2007 (EP) .................................. 07102789

(51) Int. Cl.
*B01D 33/15* (2006.01)
*B01D 33/21* (2006.01)
*B01D 33/50* (2006.01)

(52) U.S. Cl. ........ 210/797; 210/780; 210/138; 210/331; 210/333.1; 210/391; 210/409; 210/413

(58) Field of Classification Search .................. None
See application file for complete search history.

(56) References Cited

U.S. PATENT DOCUMENTS

| 1,804,934 | A | * | 5/1931 | Hoyt | 210/327 |
| 2,839,194 | A | * | 6/1958 | Lopker et al. | 210/772 |
| 2,932,402 | A | * | 4/1960 | Logne et al. | 210/383 |
| 3,061,477 | A | * | 10/1962 | Lavallee | 127/9 |
| 3,075,646 | A | * | 1/1963 | Giesse | 210/391 |
| 3,163,601 | A | * | 12/1964 | Wennberg et al. | 210/196 |
| 3,169,706 | A | * | 2/1965 | Ross | 239/752 |
| 3,193,105 | A | * | 7/1965 | Putnam | 210/331 |
| 3,252,577 | A | * | 5/1966 | Anderson | 210/236 |
| 3,331,512 | A | * | 7/1967 | Vore | 210/487 |
| 3,471,026 | A | * | 10/1969 | Riker | 210/327 |
| 3,521,751 | A | * | 7/1970 | Holthuis | 210/797 |

(Continued)

FOREIGN PATENT DOCUMENTS

DE 9319221 3/1994

(Continued)

*Primary Examiner* — Robert James Popovics
(74) *Attorney, Agent, or Firm* — Coats & Bennett, P.L.L.C.

(57) ABSTRACT

A rotary disc filter device comprises a rotary drum and a plurality of disc-shaped filter members secured about the drum. Each disc-shaped filter member has a filtering material disposed on the outside thereof. A guide bar extends longitudinally across the disc-shaped filter members and has a movable carriage mounted thereon. One or more nozzles are operatively connected to the carriage for delivering cleaning fluid onto the filtering materials. The guide bar is rotates between a cleaning position and an adjustment position. When the guide bar is in the cleaning position, the nozzle is disposed adjacent to one of the disc-shaped filter members such that the nozzle is positioned to deliver cleaning fluid onto the filtering material. When the guide bar is in the adjustment position, the carriage is movable along the guide bar without interference from the disc-shaped filter members.

21 Claims, 6 Drawing Sheets

U.S. PATENT DOCUMENTS

| | | | | |
|---|---|---|---|---|
| 3,591,009 | A * | 7/1971 | Luthi et al. | 210/247 |
| 4,017,399 | A * | 4/1977 | Lopker | 210/408 |
| 4,136,028 | A * | 1/1979 | Toivonen | 210/780 |
| 4,201,672 | A * | 5/1980 | Kenyon | 210/225 |
| 4,261,831 | A * | 4/1981 | Linsenmeyer | 210/391 |
| 4,303,524 | A * | 12/1981 | Richards et al. | 210/406 |
| RE31,792 | E * | 1/1985 | Colomer | 134/181 |
| 4,597,862 | A * | 7/1986 | Davis | 210/106 |
| 4,639,315 | A * | 1/1987 | Fuchs et al. | 210/333.1 |
| 4,646,769 | A * | 3/1987 | O'Brien et al. | 134/199 |
| 4,676,901 | A * | 6/1987 | Ragnegard | 210/331 |
| 4,695,381 | A * | 9/1987 | Ragnegard | 210/403 |
| 4,946,602 | A * | 8/1990 | Ekberg et al. | 210/785 |
| 4,975,189 | A * | 12/1990 | Liszka | 210/327 |
| 4,995,991 | A * | 2/1991 | Ljokkoi et al. | 210/797 |
| 5,124,029 | A * | 6/1992 | Fjallstrom et al. | 209/250 |
| 5,143,555 | A * | 9/1992 | Brady | 134/42 |
| 5,149,448 | A * | 9/1992 | Mattelmaki | 210/784 |
| 5,296,098 | A * | 3/1994 | Fjallstrom | 162/55 |
| 5,470,472 | A * | 11/1995 | Baird et al. | 210/391 |
| 5,759,397 | A * | 6/1998 | Larsson et al. | 210/331 |
| 5,849,202 | A * | 12/1998 | Koch et al. | 210/780 |
| 5,851,392 | A * | 12/1998 | Brady, Jr. | 210/396 |
| 5,897,788 | A * | 4/1999 | Ketolainen et al. | 210/784 |
| 5,900,158 | A * | 5/1999 | Ruokolainen et al. | 210/772 |
| 5,951,861 | A * | 9/1999 | Strid | 210/232 |
| 5,968,372 | A * | 10/1999 | Martensson et al. | 210/741 |
| 6,063,294 | A * | 5/2000 | Martensson et al. | 210/739 |
| 6,231,761 | B1 * | 5/2001 | Mohlin et al. | 210/232 |
| 6,258,282 | B1 * | 7/2001 | Strid et al. | 210/780 |
| 6,283,306 | B1 * | 9/2001 | Nilsson | 210/391 |
| 6,294,098 | B1 * | 9/2001 | Bergmann | 210/791 |
| 6,461,507 | B1 * | 10/2002 | Ishigaki et al. | 210/333.01 |
| 6,596,166 | B1 * | 7/2003 | Danielsson et al. | 210/324 |
| 6,634,372 | B2 * | 10/2003 | Bergmann | 134/148 |
| D497,660 | S * | 10/2004 | Danielsson et al. | D23/209 |
| 6,800,197 | B1 * | 10/2004 | Kosola et al. | 210/193 |
| 6,833,077 | B2 * | 12/2004 | Flanagan | 210/772 |
| 6,858,140 | B2 * | 2/2005 | Smith et al. | 210/332 |
| 7,005,067 | B2 * | 2/2006 | Flanagan | 210/248 |
| 7,597,805 | B2 * | 10/2009 | Danielsson et al. | 210/232 |
| 7,686,964 | B2 * | 3/2010 | Lownertz | 210/772 |
| 7,736,526 | B2 * | 6/2010 | Smith et al. | 210/780 |
| 7,807,050 | B2 * | 10/2010 | Baumann et al. | 210/107 |
| 7,833,424 | B1 * | 11/2010 | Baumann et al. | 210/791 |
| 7,972,508 | B2 * | 7/2011 | Danielsson et al. | 210/232 |
| 8,002,994 | B2 * | 8/2011 | Engdahl et al. | 210/768 |
| 2002/0166821 | A1 * | 11/2002 | Flanagan | 210/784 |
| 2002/0166822 | A1 * | 11/2002 | Flanagan | 210/784 |
| 2004/0045913 | A1 * | 3/2004 | Flanagan | 210/780 |
| 2004/0124158 | A1 * | 7/2004 | Smith et al. | 210/791 |
| 2005/0103727 | A1 * | 5/2005 | Flanagan | 210/772 |
| 2005/0115911 | A1 * | 6/2005 | Smith et al. | 210/791 |
| 2006/0260999 | A1 * | 11/2006 | Danielsson et al. | 210/402 |
| 2007/0221345 | A1 * | 9/2007 | Lownertz | 162/16 |
| 2007/0251891 | A1 * | 11/2007 | Lownertz et al. | 210/791 |
| 2008/0011666 | A1 * | 1/2008 | Baumann et al. | 210/411 |
| 2008/0035584 | A1 * | 2/2008 | Petit et al. | 210/780 |
| 2008/0164222 | A1 * | 7/2008 | Engdahl et al. | 210/772 |
| 2009/0020483 | A1 * | 1/2009 | Davis et al. | 210/784 |
| 2009/0020484 | A1 * | 1/2009 | Davis et al. | 210/784 |
| 2010/0012570 | A1 * | 1/2010 | Danielsson et al. | 210/235 |
| 2010/0032388 | A1 * | 2/2010 | Ralvert | 210/797 |
| 2010/0213142 | A1 * | 8/2010 | Andersson et al. | 210/784 |
| 2010/0300957 | A1 * | 12/2010 | Baumann et al. | 210/411 |
| 2010/0300989 | A1 * | 12/2010 | Baumann et al. | 210/791 |
| 2011/0120960 | A1 * | 5/2011 | Smith et al. | 210/791 |

FOREIGN PATENT DOCUMENTS

| | | |
|---|---|---|
| EP | 0247445 | 12/1987 |
| EP | 1961475 A1 * | 8/2008 |
| WO | WO 2004076026 A1 * | 9/2004 |

* cited by examiner

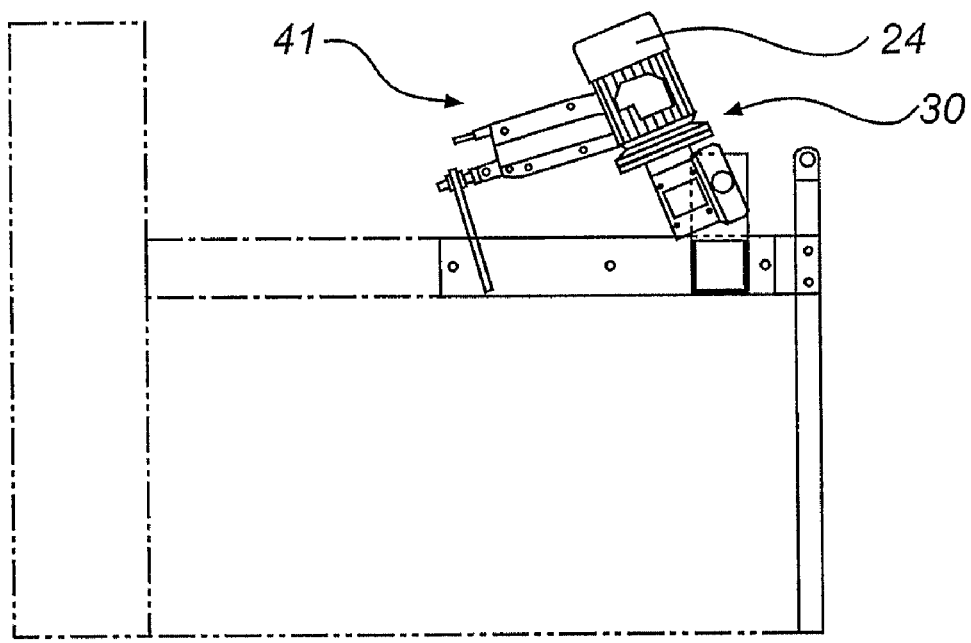
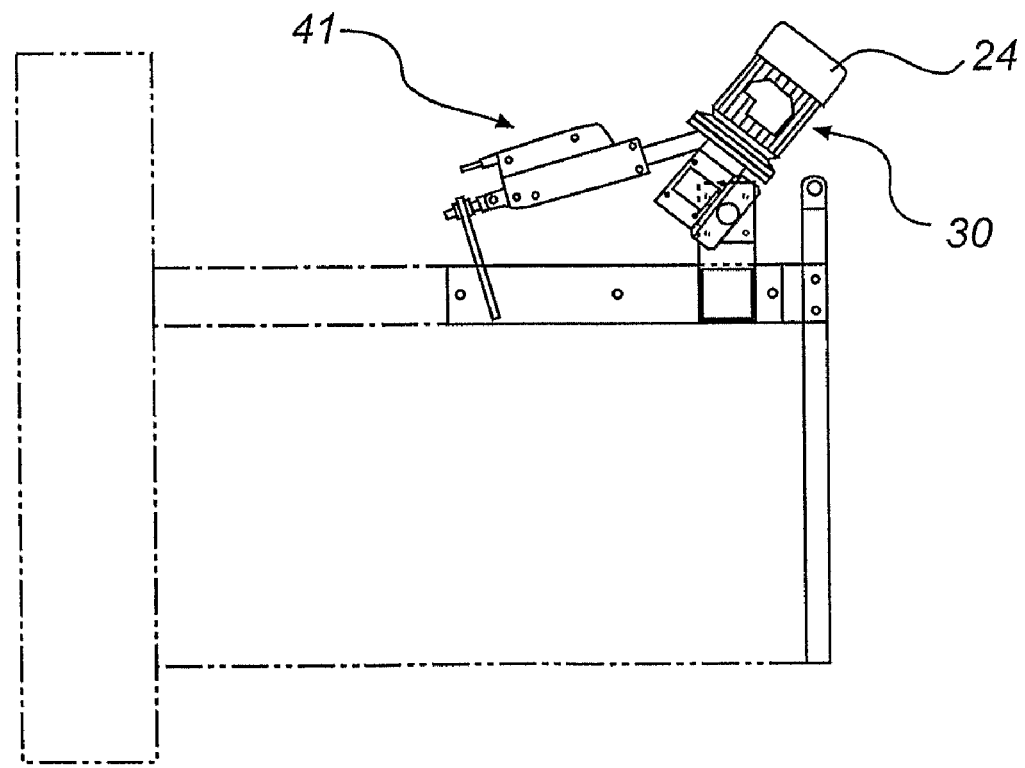
Fig. 5

DEVICE AND METHOD FOR CLEANING A FILTER CLOTH

This application is a U.S. National Stage Application of PCT Application No. PCT/SE2008/000140, with an international filing date of 21 Feb. 2008. Applicant claims priority based on European Application No. 07102789.0 filed 21 Feb. 2007.

FIELD OF THE INVENTION

The present invention relates to a device for cleaning a filter cloth in a filter, said device comprising a flushing ramp, on which at least one spray nozzle is arranged, said spray nozzle being arranged to spray a cleaning fluid onto the filter cloth in a direction opposite a filtering direction. The invention also relates to a method of cleaning a filter cloth in a filter.

BACKGROUND ART

Filtering devices, for instance rotary disc filters, are used especially for filtering off particles from liquids.

A common rotary disc filter is disclosed, for instance, in SE-C-224 131 and the principle thereof is illustrated in FIG. 1. The rotary disc filter 1 comprises a horizontal, slowly rotating drum 11, which supports a number of parallel, disc-shaped filter elements 12 which are successively arranged in spaced-apart relationship along the centre axis of the drum and which extend radially away from the drum. The filter elements 12 have on their opposite lateral surfaces relatively large openings which are covered with a filter cloth 13. The drum has a number of openings through which the liquid A which is to be filtered can flow to the interior of the filter elements 12. The filtering liquid A is conducted through an inlet into the drum 11 and then falls down to the interior of the filter elements 12, from which the liquid A continues out through the filter cloth 13 so that the particles which are to be filtered off adhere to the inside of the filter cloth.

The rotary disc filter 1 can be cleaned by backwashing by means of a cleaning device of the type described, for instance, in SE-C-515 001 (WO 00/37159). This filter cleaning device is provided with spray nozzles 14 which are mounted on a plurality of fixed flush tubes 15, which project between the disc-shaped filter elements 12. The flush tubes 15 are adapted to conduct flushing liquid to the spray nozzles 14 and are connected to an elongate liquid-conducting tube 16 which extends parallel to the centre axis of the drum. The spray nozzles 14 spray liquid onto the filter cloth 13 axially from outside, in a direction opposite the filtering direction and flushed-off particles are collected in a discharge chute 17 which is placed inside the drum 11 in the upper portion thereof.

This known cleaning device may also be used in drum filters. An example of a prior art drum filter is shown in FIG. 6. The drum filter 101 has a drum 113, which is rotatably arranged about the centre axis C of the drum filter 101. The drum filter shown in FIG. 6 has a cleaning device 110 with spray nozzles arranged on a fixedly arranged flush tube.

The backwashing or cleaning of the rotary disc filter or drum filter occurs continuously or intermittently and, as a rule, at a relatively low pressure in the range of 6-8 bar.

Despite the backwashing, the filter cloth of rotary disc filters and drum filters has, however, a tendency to clog after some time of use due to deposition of sludge. The clogging of the filter cloth deteriorates the capacity and the degree of efficiency of the filter. As a result, supplementary cleaning is required after some time of use, for example once a day or at other intervals depending on the load to which the filter is subjected.

In some cases, the filter cloth may become "striped" due to insufficient cleaning of certain filter portions.

To increase the cleaning effect, chemical cleaning agents can be used in backwashing, but this is disadvantageous in terms of environment and working environment.

For the purpose of again increasing the filtering capacity of the filter after clogging, manual high pressure cleaning can be performed with a liquid that has a pressure of at least 50 bar. However, manual cleaning is difficult and time consuming. To allow manual cleaning, it is for practical reasons necessary to have a certain free space in the filter installation around each filter and sometimes also ramps and scaffolds so that a person who is to clean the filter cloth using, for example, a hand-held high pressure cleaning device reaches the filter and can walk around the filter. This makes the construction of such a rotary disc filter installation expensive and results in a need for a larger space.

WO 03/004131 discloses a cleaning device for rotary disc filters, which comprises a plurality of nozzles connected to a plurality of flush tubes and valves, in which each nozzle is intended for spraying fluid at a low or high pressure onto a disc-shaped filter element. The spray nozzles can be rotated in a swinging motion relative to the filter elements. A drawback of this cleaning device is that it requires a powerful and, thus, expensive high pressure pump to supply a fluid pressure that overcomes the losses in the many throttlings and the long tube lengths of the large number of tubes and nozzles for the fluid that is finally sprayed out of the nozzles to have a pressure that is sufficiently high for cleaning.

For satisfactory cleaning of the filter cloth, a plurality of high pressure spray nozzles are according to this prior art solution arranged very close to each other, which makes the filtering device considerably more expensive and complex. It would therefore be desirable to simplify the cleaning of rotary disc filters by high pressure and make such cleaning less expensive.

Moreover it would be desirable for reasons of environment and cost to reduce the consumption of cleaning liquid, chemicals and power. It would also be desirable to reduce the amount of peripheral equipment required for cleaning and to simplify the maintenance of the cleaning equipment by reducing the number of components of the same.

SUMMARY OF THE INVENTION

An object of the present invention is to suggest a solution to the above problems by providing an improved device and an improved method for cleaning a rotary disc filter.

A specific object is to provide a cleaning device which results in reduced use of power compared with prior art cleaning devices and which does not require particularly powerful pumps.

Another object is to provide a cleaning device which enables regeneration of a rotary disc filter without using chemicals.

A further object of the invention is to provide a method which enables energy-efficient cleaning of filters.

According to the invention, these objects are achieved by a device and a method for cleaning a filter of the type stated by way of introduction.

The device according to the invention for cleaning of filters comprises the features that are stated in claim 1, with preferred embodiments in the dependent claims.

The method according to the invention for cleaning of filters comprises the features that are stated in claim 15, with preferred embodiments in the dependent claims.

In the inventive cleaning device, the flushing ramp has a driving device for moving the flushing ramp along the longitudinal direction of the filter during cleaning. In this manner, use can be made of a flushing ramp with only one or a pair of spray nozzles for cleaning of the entire filter since the flushing ramp can be moved from along the filter. As a result, the necessary pipe lengths and, thus, the pressure losses are reduced, and therefore the pump used need not be very powerful.

The cleaning device may be used for a rotary disc filter, wherein the filter cloth is arranged on disc shaped filter elements which are arranged side by side along the longitudinal direction of the rotary disc filter and rotatably arranged about a centre axis of the rotary disc filter.

Alternatively, the cleaning device may be used for a drum filter, wherein the filter cloth is arranged on a drum which is arranged in the longitudinal direction of the drum filter and rotatably arranged about a centre axis of the drum filter.

According to a preferred embodiment of the invention, said at least one spray nozzle is a high pressure spray nozzle arranged to spray the cleaning fluid at a pressure of at least 15 bar. This pressure makes it possible to perform excellent rough cleaning of the filter.

The driving device can be arranged to move the flushing ramp step by step along the longitudinal direction of the filter. As a result, the flushing ramp can be moved to a portion of the filter and flush it clean and then be moved to the next portion of the filter.

The driving device is advantageously arranged to move said at least one spray nozzle along a disc-shaped filter element in a radial direction relative to the disc-shaped filter element. Thus, the entire filter cloth on one side of the disc-shaped filter element can be effectively cleaned.

In one embodiment, the driving device is arranged to move said at least one spray nozzle step by step along a disc-shaped filter element in a radial direction relative to the disc-shaped filter element. By moving the spray nozzle step by step the disc-shaped filter element can rotate one revolution while the spray nozzle stands still, thus cleaning the entire revolution.

The flushing ramp can be non-rotatably and movably arranged on an elongate guide means along the longitudinal direction of the filter. In this way, the movement of the flushing ramp in the longitudinal direction of the rotary disc filter can be provided in a mechanically simple manner.

The elongate guide means is advantageously pivotally arranged about an axis parallel to the centre axis of the rotary disc filter, whereby the radial movement of the spray nozzle can easily be performed.

The driving device may comprise a loop-shaped drive for performing step-by-step movement of the flushing ramp along the longitudinal direction of the filter. This is a mechanically simple way of providing the longitudinal movement.

In a preferred embodiment, two spray nozzles are arranged on the flushing ramp. In this manner, two filter cloth surfaces can be cleaned simultaneously.

The two spray nozzles are advantageously arranged to be introduced, during cleaning, on both sides of a disc-shaped filter element and spray cleaning fluid onto the filter cloth on one side each of the disc-shaped filter element. Thus, both sides of the filter element are cleaned simultaneously, which is particularly effective since the jets of cleaning fluid can then intersect.

Alternatively, the two spray nozzles can be arranged to be introduced, during cleaning, on both sides of a first disc-shaped filter element and each spray cleaning fluid onto the filter cloth of an associated neighbouring disc-shaped filter element on both sides of the first disc-shaped filter element.

In an alternative embodiment, a spray nozzle is arranged on the flushing ramp, said spray nozzle being rotatably mounted to be introduced, during cleaning, between a first and a second disc-shaped filter element and spray cleaning fluid first onto the first disc-shaped filter element and then onto the second disc-shaped filter element. With only one spray nozzle, it will thus be possible to clean both sides of a filter element.

In the inventive method of cleaning a filter cloth in a filter, the flushing ramp is moved along the longitudinal direction of the filter during cleaning. This method makes it possible to effectively clean a filter with a reduced pipe length and reduced pump capacity compared to prior art methods.

The cleaning device may be used for a rotary disc filter, wherein the filter cloth is arranged on disc shaped filter elements which are arranged side by side along the longitudinal direction of the rotary disc filter and rotatably arranged about a centre axis of the rotary disc filter.

Alternatively, the cleaning device may be used for a drum filter, wherein the filter cloth is arranged on a drum which is arranged in the longitudinal direction of the drum filter and rotatably arranged about a centre axis of the drum filter.

In a preferred variant of the method, said at least one spray nozzle sprays the cleaning fluid at a pressure of at least 15 bar. The high pressure makes it possible to perform good rough cleaning of the filter, and besides the consumption of cleaning fluid is reduced.

The flushing ramp is advantageously moved step by step along the longitudinal direction of the filter. As a result, a portion of the filter can be cleaned and the flushing ramp then be moved further for cleaning of the other filter portions.

The flushing ramp can be moved one step for each disc-shaped element. This makes it possible to clean one filter element at a time.

Said at least one spray nozzle is advantageously moved along a disc-shaped filter element in a radial direction relative to the disc-shaped element, which makes it possible to effectively clean the entire filter cloth on one side of the filter element.

In a preferred variant of the method, the spray nozzle is moved step by step in the radial direction. In this manner, the filter element can rotate while the spray nozzle stands still, so that the filter cloth can be cleaned effectively, without necessitating complicated movements of the spray nozzle.

In a variant of the method, the spray nozzle is moved step by step in the radial direction in such a manner that the disc-shaped element rotates one revolution while said at least one spray nozzle stands still. As a result, the entire revolution can be effectively cleaned.

The filter cloth on both sides of one and the same disc-shaped filter element is preferably sprayed with the cleaning fluid simultaneously. This results in particularly effective cleaning since the jets from the two nozzles intersect.

Alternatively, the filter cloth on opposite sides of two neighbouring disc-shaped filter elements can be sprayed with cleaning fluid simultaneously.

According to another alternative, first the filter cloth on a first side of a disc-shaped filter element is sprayed with the cleaning fluid, and, after that, the filter cloth on a second side of the disc-shaped filter element. In this way, a cleaning device with only one spray nozzle can be used for cleaning both sides of the filter elements of the rotary disc filter.

BRIEF DESCRIPTION OF THE DRAWINGS

The invention will in the following be described in more detail with reference to the accompanying drawings which by way of example illustrate preferred embodiments of the invention.

FIG. 5 is an end view illustrating two different angle positions of the cleaning device according to the invention.

DETAILED DESCRIPTION OF A PREFERRED EMBODIMENT

Figure 1:
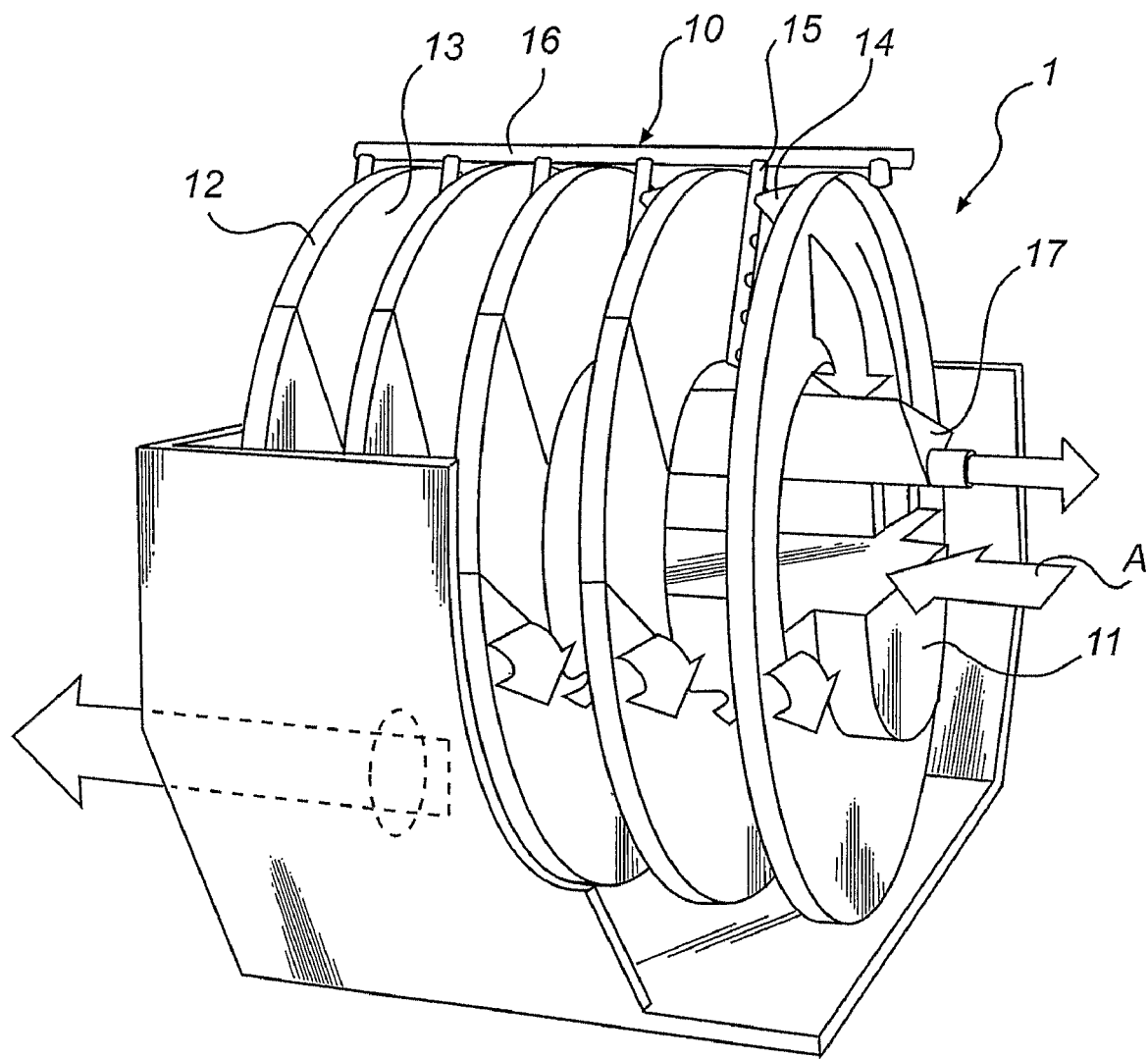
FIG. 1 is a perspective view which schematically illustrates the principle of a rotary disc filter according to prior art.
Figure 2:
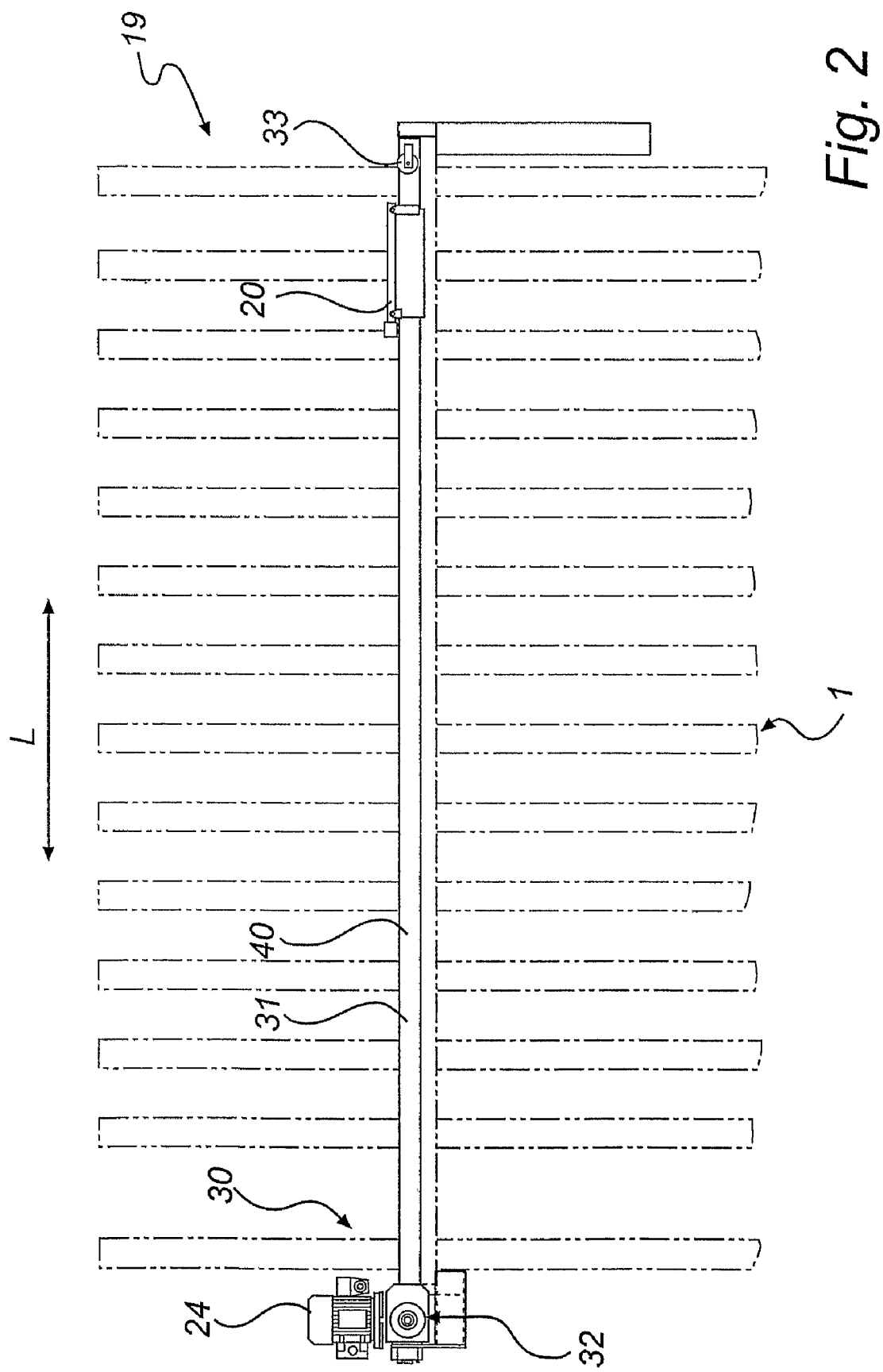
FIG. 2 is a side view of a rotary disc filter, in which a cleaning device according to the invention is shown.
Figure 3:
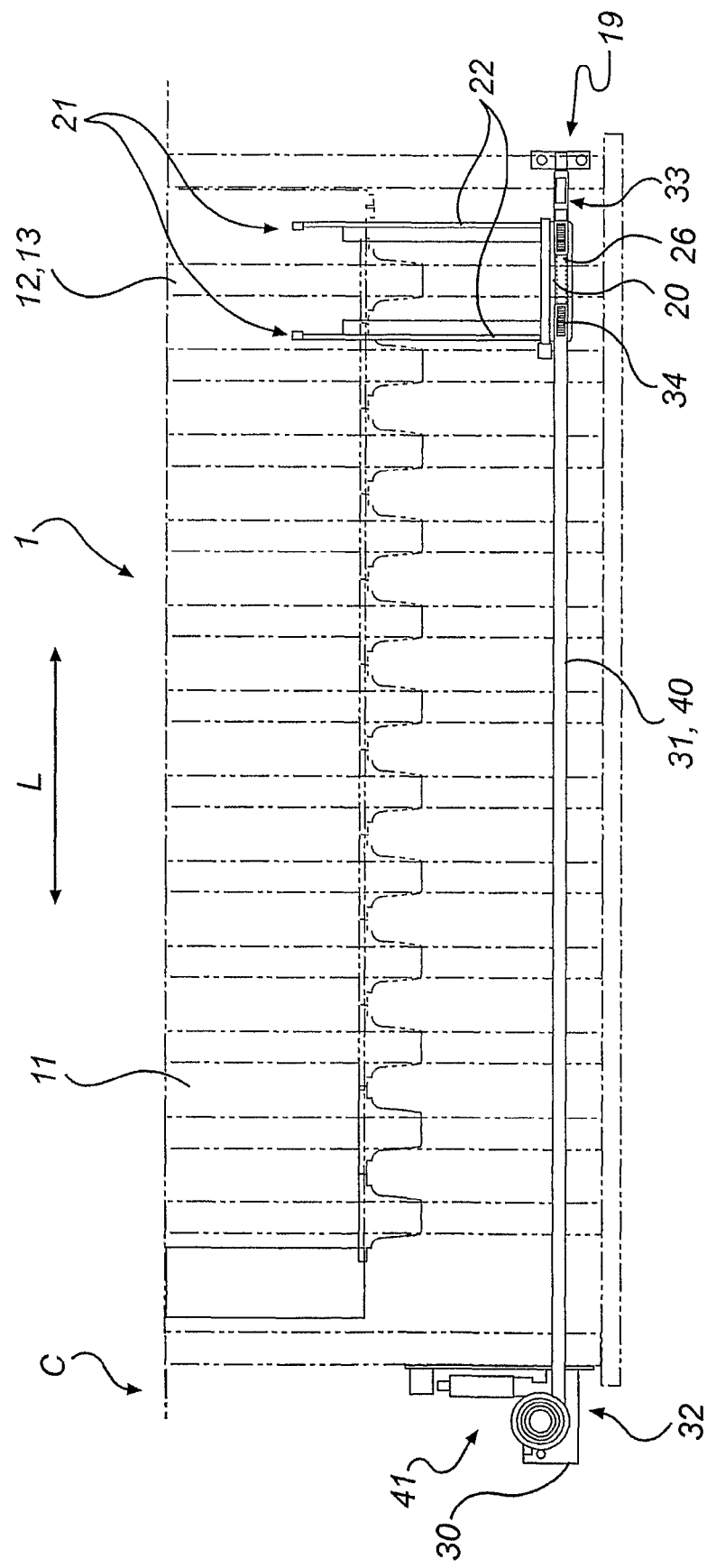
FIG. 3 is a top plan view of the cleaning device in FIG. 2.
Figure 4:
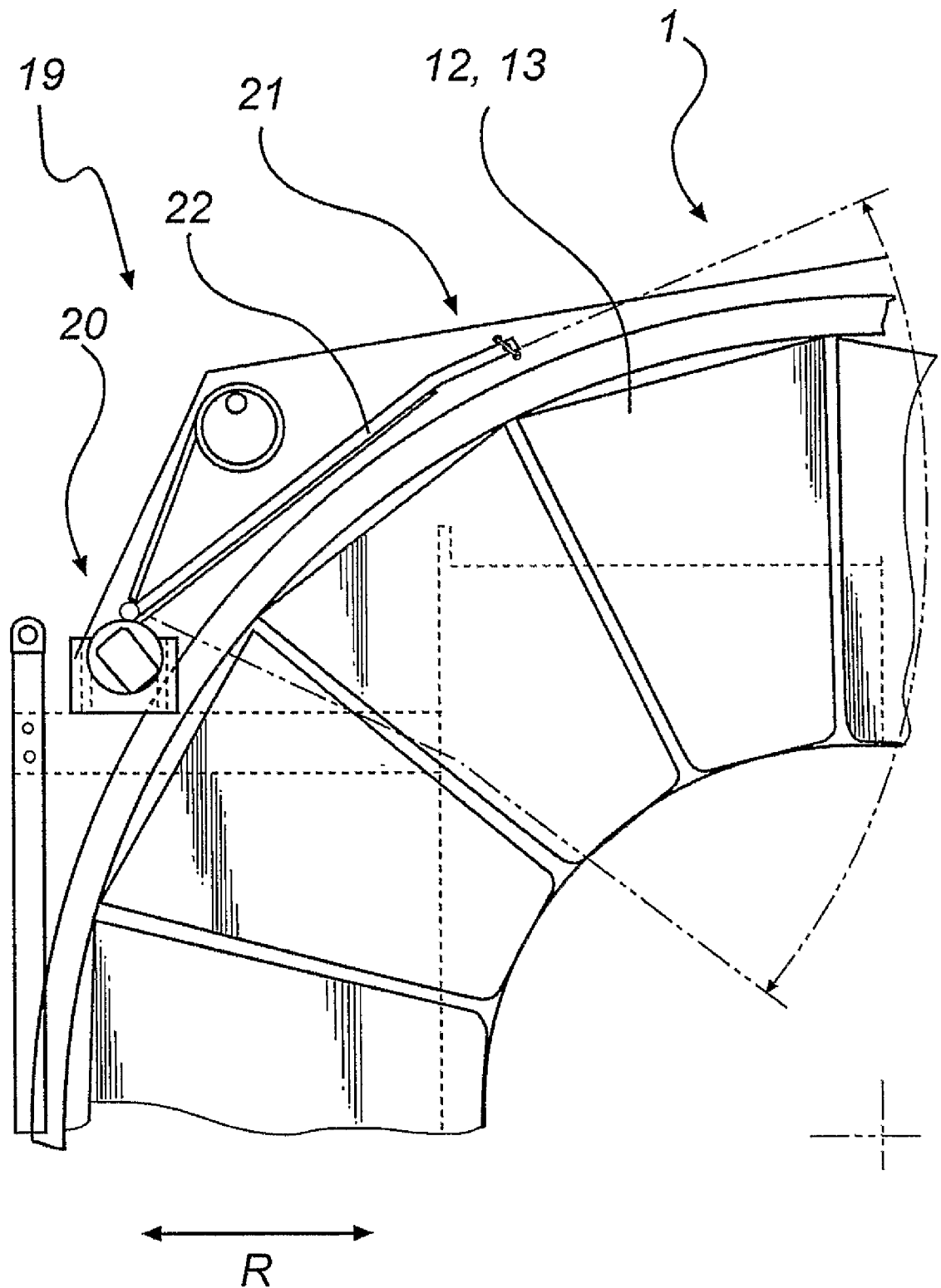
FIG. 4 is a partial view on a larger scale of the cleaning device shown in FIG. 2 seen in the longitudinal direction of the rotary disc filter.

A rotary disc filter cleaning device 19 according to the invention is illustrated in FIGS. 2-5. The cleaning device 19 is intended for rough cleaning of a rotary disc filter 1 with a cleaning liquid, preferably water, which is flushed or sprayed under high pressure, that is a pressure of at least 15 bar, onto the rotary disc filter for removal of deposited sludge. The pressure is preferably 15-200 bar, most preferred 60-100 bar.

In a first embodiment of the rotary disc filter cleaning device 19 according to the invention, it comprises two high pressure spray nozzles 21 which are fixedly mounted on a high pressure flush tube 22 each. The flush tubes 22 are in turn fixedly connected to the high pressure flushing ramp 20 and extend in a plane substantially perpendicular to the axis of rotation C of the drum. Cleaning according to the invention occurs by a method in steps by moving the high pressure flushing ramp 20 with its spray nozzles 21 along the length of the rotary disc filter step by step during cleaning of the disc-shaped filter elements 12 of the rotary disc filter 1.

The rotary disc filter 1 that is to be cleaned by the cleaning device 19 is made up in prior art manner with disc-shaped filter elements 12 or filter discs with filter cloth 13 which on the outside of the rotary disc filter drum 11 extends outwards in the transverse direction of the drum 11. The rotary discs 21 are spaced from each other along their entire filter cloth surface so as not to collide with each other and associated parts of the cleaning device 12 during their rotation. The basic function of a rotary disc filter of this type is illustrated in FIG. 1. The liquid A to be filtered is passed through an inlet to the interior of the drum 11. From the interior of the drum 11, the filtering liquid A is passed out through openings in the circumferential surface of the drum 11 to the interior of the filter discs 12. From there the filtering liquid A is then passed in a filtering direction out through the filter cloth 13. Particles in the filtering liquid A adhere to the inside of the filter cloth 13.

The normal backwashing of the filter cloth 13 of the filter discs 12 is performed by means of the cleaning device 10 in FIG. 1, in most cases several times a day. After use for some time, for instance a day or a week, it is, however, necessary to perform more powerful cleaning, and this rough cleaning is done using the inventive cleaning device.

In cleaning with the inventive cleaning device 19, the filter cloth of the rotary disc filter is cleaned by the high pressure flushing ramp 20 by the two opposite spray nozzles 21 being inserted each into a gap between two filter discs 12 on both sides of a filter disc 12. In this way, one filter disc 12 at a time is cleaned by water being sprayed onto the filter cloth 13 on each side of the filter disc 12.

The high pressure flush tubes 22 are adapted to conduct the flushing liquid to the spray nozzles 21 and are connected to a common, elongate, liquid-conducting conduit or flexible hose 25. Flushing liquid is supplied to the high pressure flush tubes 22 by means of a high pressure spray pump 24.

The hose 25 can be helically wound to provide flexibility. The hose 25 extends substantially parallel to the centre axis C of the drum and is supplied with liquid by the high pressure pump 24.

The high pressure spray nozzles 21 are fixedly mounted at a free end of a high pressure flush tube 22 each, each tube being, at its other end, mounted on the high pressure flushing ramp 20, which is arranged adjacent to the rotary disc filter 1 outside the disc-shaped filter elements 12. The high pressure flushing ramp 20 is non-rotatably but linearly movable along an elongate guide means 40 extending parallel to the centre axis C of the drum. The guide means 40 can have the shape of a square rod extending along the rotary disc filter 1.

The cleaning device 19 has a driving device 30 which moves the high pressure flushing ramp 20 along the rotary disc filter 1 step by step, that is one step for each disc-shaped filter element 12 by means of an endless loop-shaped drive in the form of a belt 31. The belt 31 extends substantially along the entire length of the guide means and round the circumferential surfaces of terminal wheels 32, 33 for engagement of these at each end of the guide means 40. The driving device 30 has a control unit (not shown) which synchronises the reciprocating movement of the flushing ramp 20 and the movement of each spray nozzle 21 along the filter cloth 13 with the need for such cleaning. This means that the control unit starts cleaning if the filtering capacity of the filter 1 has fallen below a predetermined value or after a certain time of operation of the filter, for instance a day, a week, a month or a shorter or longer time. The high pressure cleaning according to the invention can be controlled in a desirable manner and automatically and, thus, be performed in any desirable way, also irregularly, which means that the filter 1 need not be checked optically or manually for degree of dirtiness. Unnecessary cleaning of the same filter element 12 or the same parts of the filter cloth 13 by means of a high pressure spray nozzle 21 is also prevented. This also means that the filter cloth 13 is subjected to direct flushing by a high pressure spray nozzle 21 only when needed and not arbitrarily, whereby the filter cloth will be worn to a lesser extent.

The belt 31 is in meshing engagement by means of fixed fastening points 34 in the form of grooves or notches on the outside of the high pressure flushing ramp 20, and is in engagement with a belt terminal driving wheel 22 which is non-rotatably connected to the driving device 30. The positive drive belt 31 transfers the rotation of the belt driving wheel 32 performed by the driving device to a simultaneous linear movement of the high pressure flushing ramp between the ends of the guide means 40. The second belt terminal wheel 32 functions as a tensioning wheel to keep the belt tensioned. The belt 31 and the belt wheels 32, 33 can be in engagement with each other by force or form fitting, for instance by friction, cogs or teeth. In this embodiment, the belt 31 is a positive drive belt and the wheels 32, 33 positive drive belt wheels. The positive drive belt 31 is, as already mentioned, in engagement with the flushing ramp 20, whose movement is performed by a slide 26 which is connected to the flushing ramp and movable along the rotary disc filter 1 on the guide means 40 and which is part of the flushing ramp. The loop-shaped drive thus performs, together with, inter alia, the slide, a simple, inexpensive, robust and reliable transfer of movement for the flushing ramp along the rotary disc filter.

The guide means 40 extends through the flushing ramp 20 and its ends are pivotally or rotatably suspended, each end positioned at a corresponding rotary disc filter end. The guide means 40 is thus, together with the high pressure flushing ramp 20, pivotable about its longitudinal axis, which is an axis of rotation that is parallel to the centre axis C of the rotary disc filter. This means that the flushing ramp 20 can be rotated in a plane substantially perpendicular to the centre axis C of the rotary disc filter. This rotation can take place by means of a rotating device in the form of an actuator 41 with a piston that tilts the pump 24 and the guide means 40. In this way the flushing ramp 20 moves in a tangential direction relative to the filter discs. This tangential movement causes the spray nozzles 21 to move substantially radially R along the filter discs 12. The movement of the guide means 40, and thus the spray nozzles 21, occurs step by step, so that the spray nozzles stand still for a moment while they spray water onto the filter cloth 13 of the filter disc 12. The spray nozzles 21 stand still for so long that the filter disc 12 has time to rotate one revolution. In this manner, the filter cloth 13 of the filter disc 12 is cleaned during the entire revolution. After one revolution of cleaning, the actuator 41 tilts the guide means 40 a little further so that the spray nozzles 21 reach a new revolution of the filter cloth 13. The step-by-step movement occurs so that the spray nozzles 21 are moved from an outermost radius of the filter disc 12 to an innermost radius. The movement of the spray nozzles 12 can, of course, also be made in reverse order so that during cleaning they move from inside out. The filter cloth 13 of the entire filter disc 12 is cleaned step by step, and then the actuator 41 again raises the guide means 40 so that the spray nozzles 21 are moved outside the filter discs 12. Subsequently the flushing ramp 20 is moved one step in the longitudinal direction L to the next filter disc 12, and cleaning of this filter disc 12 takes place.

In the embodiment described above, the spray nozzles 21 are oriented in two different directions inward towards each other and towards the same filter disc 12 for cleaning thereof. This also means that their outlets open just opposite each other and in pairs inward towards each other and the filter disc 12, so that opposing filter cloth lateral surfaces of a filter disc 12 are subjected to spraying at the same time from two different directions with cleaning liquid during cleaning of the same filter disc 12. With the spray nozzles 21 facing each other, the jets of cleaning liquid can besides be made to intersect, which additionally renders cleaning more effective.

In a second embodiment (not shown), the spray nozzles are facing away from each other instead of facing each other like in the first embodiment. With this construction, the filter cloth is instead cleaned on one side of two different filter discs at a time. In the same way as before, the spray nozzles are inserted between the filter discs and moved step by step along the surface of the filter discs. Since the spray nozzles are facing away from each other, they spray water onto the opposite sides of the two neighbouring filter discs.

In a third embodiment (not shown) of the rotary disc filter cleaning device according to the invention, it comprises only one high pressure spray nozzle which is fixedly mounted on a high pressure flush tube, which in turn is rotatably connected to the flushing ramp. The flush tube can be connected to the flushing ramp by means of a swivel to provide the rotatability. Alternatively, the flush tube can be fixedly connected to the flushing ramp, while the spray nozzle is rotatably connected to the flush tube, for example by means of a swivel. With this construction, the number of components of the cleaning device is kept at a minimum, but nevertheless it will be possible to clean both sides of all filter discs. The spray nozzle first sprays cleaning liquid onto one side of one filter disc and is then rotated to spray cleaning liquid onto the opposite side of the next filter disc. Subsequently the flushing ramp is moved in the same way as stated above to the next gap between two filter discs. A drawback of this construction is, however, that the time required for cleaning is doubled compared with the first two embodiments, since only one side of the filter discs is cleaned at a time.

The cleaning device 19 can be mounted when manufacturing a rotary disc filter, but it can also be mounted in an existing rotary disc filter.

It will be appreciated that a large number of modifications of the embodiments of the invention described above are conceivable within the scope of the invention, which is defined by the appended claims.

For example, the flushing ramp could be provided with four flush tubes, each having one spray nozzle, so that two filter elements can be cleaned at the same time. This increases in fact the tube lengths and, thus, the required pump capacity, but not at all to the level that is necessary for prior art cleaning devices with two spray nozzles for each filter element.

Instead of moving the spray nozzles step by step, they could be made to swing continuously up and down, although the stepwise movement is preferred.

The actuator 41 which is used to tilt the guide means 40 can be replaced by, for example, a hydraulic or pneumatic cylinder, or any other suitable means.

Figure 6:
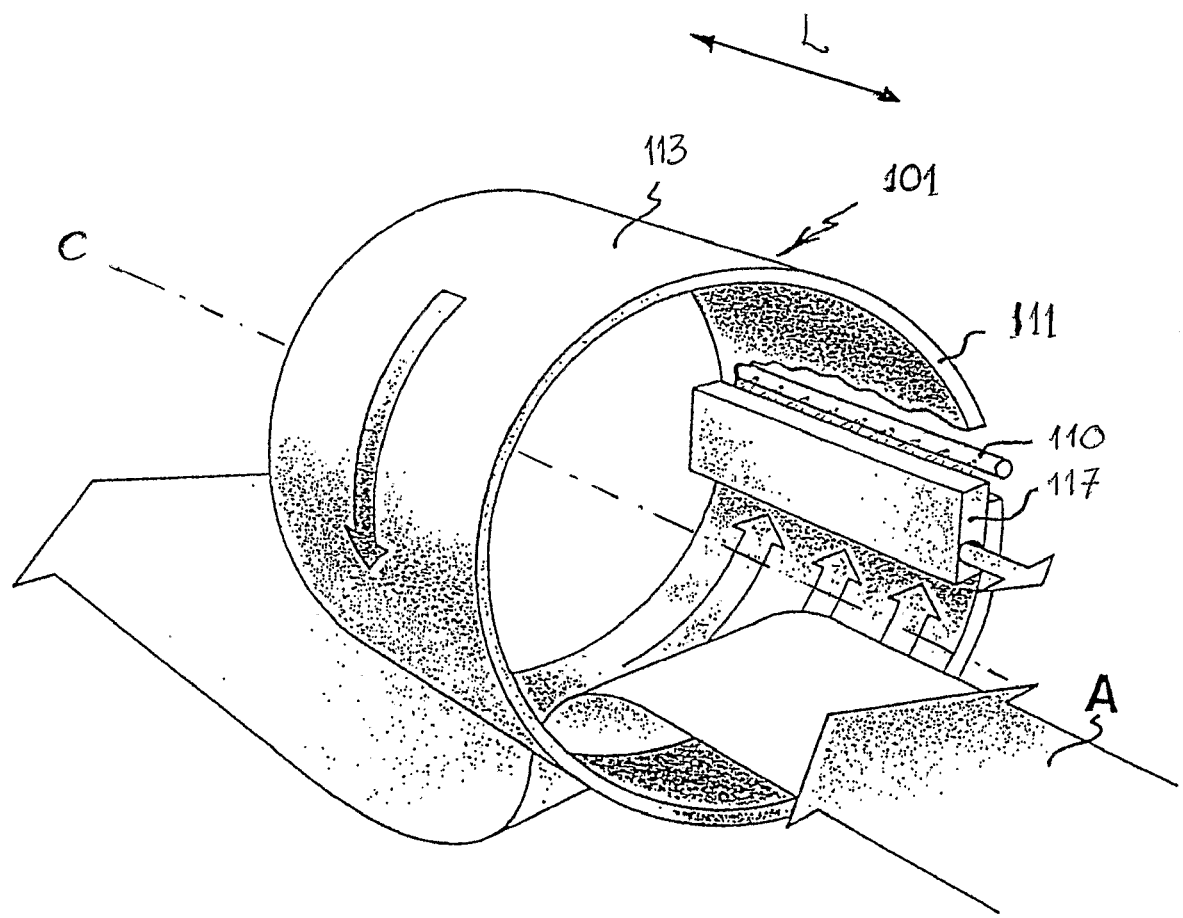
FIG. 6 is a perspective view which schematically illustrates the principle of a drum filter according to prior art.

Another embodiment of the cleaning device described above may be used for cleaning drum filters of the type shown in FIG. 6. Just as when cleaning a rotary disc filter, the flushing ramp is moved along the longitudinal direction L of the drum filter 101, cleaning a portion of the filter cloth 113 at a time. However, the cleaning device may be simplified when used for drum filters 101, since there is no need for the radial movement of the spray nozzles. Cleaning of a complete revolution of the drum 111 is instead ensured by rotating the drum 111. Further, the spray nozzles may be arranged directly on the flushing ramp, without the need for the flush tubes.

The inventive cleaning device and cleaning method are above all intended for periodic rough cleaning of a filter and therefore advantageously use a relatively high pressure. However, the invention can also be used for ordinary backwashing of a filter and then preferably uses a somewhat lower pressure.

The invention claimed is:
1. A rotary disc filter device comprising:
 a. a rotary drum having an inlet for receiving liquid to be filtered;
 b. a plurality of disc-shaped filter members secured about the drum and extending outwardly therefrom, each disc-shaped filter member being rotatable with the drum about an axis of rotation;
 c. each disc-shaped filter member having a filtering material disposed on the outside thereof;
 d. a guide bar disposed adjacent to the disc-shaped filter members and outside of the rotary drum, the guide bar extending longitudinally across the disc-shaped filter members in a direction generally parallel to the axis of rotation;
 e. a carriage mounted on the guide bar and movable back and forth along the guide bar;
 f. one or more nozzles operatively connected to the carriage for delivering cleaning fluid onto the filtering materials and cleaning the filtering materials;
 h. a drive for driving the carriage along the guide bar;

g. a pump operatively connected to the nozzle for delivering cleaning fluid to the nozzle;
   i. wherein the guide bar is rotatably mounted adjacent to the disc-shaped filter members such that the guide bar rotates between a cleaning position and an adjustment position;
   j. wherein when the guide bar is in the cleaning position, the nozzle is disposed adjacent to one of the disc-shaped filter members such that the nozzle is positioned to deliver cleaning fluid onto the filtering material; and
   k. wherein when the guide bar is in the adjustment position, the carriage and the nozzle are movable along the guide bar without interference from the disc-shaped filter members.

2. The rotary disc filter device of claim 1 wherein the rotary disc filter device includes two nozzles and wherein when the guide bar is in the cleaning position, each nozzle is positioned on either side of one of the disc-shaped filter members such that the cleaning fluid is delivered onto both sides of the filtering material disposed on the outside of the disc-shaped filter member.

3. The rotary disc filter device of claim 1 wherein in each nozzle is operatively connected to an elongate arm, and wherein the elongate arm operatively connects the carriage and the nozzle.

4. The rotary disc filter device of claim 3 further comprising a hose operatively connecting the pump to the elongate arm for delivering cleaning fluid to the nozzle, at least a portion of the hose extending substantially parallel to the axis of rotation.

5. The rotary disc filter device of claim 3 wherein the filtering material has a capacity for filtering liquid and the rotary disc filter device further includes a control unit that regulates the delivery of cleaning fluid from the pump to the nozzle so that cleaning fluid is delivered to the nozzle if the capacity of the filtering material has fallen below a predetermined value.

6. The rotary disc filter device of claim 1 wherein the drive for driving the carriage includes an endless belt extending adjacent the guide bar.

7. The rotary disc filter device of claim 6 wherein the belt is trained around two opposing pulleys.

8. The rotary disc filter device of claim 1 further including a control unit that regulates the delivery of cleaning fluid from the pump to the nozzle so that cleaning fluid is delivered to the nozzle after a specified period of time.

9. The rotary disc filter device of claim 1 wherein the pump is rotatable with the guide bar between the cleaning position and the adjustment position.

10. The rotary disc filter device of claim 1 wherein the nozzle sprays cleaning fluid onto the filtering materials at a pressure of at least 15 bar.

11. The rotary disc filter device of claim 1 wherein when the guide bar is in both the cleaning and the adjustment positions, the one or more nozzles extend in a plane generally perpendicular to the axis of rotation.

12. The rotary disc filter device of claim 1 wherein the rotary disc filter device includes two nozzles and wherein when the guide bar is in the cleaning position, each nozzle is disposed on either side of a first disc-shaped filter member and positioned such that the nozzles deliver cleaning fluid onto the filtering materials of the disc-shaped filter members disposed on either side of the first disc-shaped filter member.

13. A rotary disc filter device comprising:
   a. a rotary drum having an inlet for receiving liquid to be filtered;
   b. a plurality of disc-shaped filter members secured about the drum and extending outwardly therefrom, each disc-shaped filter member being rotatable with the drum, and wherein the disc-shaped filter members define an outer perimeter;
   c. each disc-shaped filter member having a filtering material disposed on the outside thereof;
   d. a support structure disposed adjacent to the disc-shaped filter members and disposed outside of the outer perimeter, the support structure extending longitudinally across the disc-shaped filter members;
   e. a carriage mounted on the support structure and movable back and forth along the support structure;
   f. one or more nozzles supported by the carriage for delivering cleaning fluid onto the filtering materials of the disc-shaped filter members;
   g. a pump operatively connected to the nozzle for delivering cleaning fluid to the nozzle;
   h. means for rotatably moving the nozzle from a position outside the outer perimeter of the disc-shaped filter members to a position inside of the outer perimeter of the disc-shaped filter members; and
   i. means for incrementally moving the carriage along the support structure.

14. The rotary disc filter device of claim 13 wherein the means for rotatably moving the nozzle comprises an actuator operatively connected to the support structure and disposed adjacent an end portion of the rotary disc filter device.

15. The rotary disc filter device of claim 14 wherein the actuator includes a pneumatic cylinder.

16. The rotary disc filter device of claim 14 wherein the actuator includes a hydraulic cylinder.

17. A method of cleaning filtering materials disposed on disc-shaped filter members of a rotary disc filter, the method comprising:
   a. incrementally moving a carriage along a guide bar extending across the disc-shaped filter members, such that the carriage moves in a direction generally parallel to an axis of rotation of the disc-shaped filter members, wherein incrementally moving the carriage comprises stopping the carriage adjacent to a first disc-shaped filter member before moving the carriage adjacent to the second adjacent disc-shaped filter member;
   b. while the carriage is stopped adjacent to the first disc-shaped filter member, rotating the guide bar relative to the disc-shaped filter members from an adjustment position to a cleaning position, wherein in the cleaning position, a nozzle operatively connected to the carriage is positioned to deliver cleaning fluid onto the filtering material of one of the disc-shaped filter members;
   c. pumping cleaning fluid from a pump to the nozzle and spraying the cleaning fluid from the nozzle onto the filtering material;
   d. after spraying the filtering material, rotating the guide bar relative to the disc-shaped filter members from the cleaning position to the adjustment position, wherein in the adjustment position, the carriage and the nozzle are movable along the guide bar without interference from the disc-shaped filter members; and
   e. moving the carriage along the guide bar and stopping the carriage adjacent to the second adjacent disc-shaped filter member and rotating the guide bar relative to the disc-shaped filter members from the adjustment position to the cleaning position.

18. The method of claim 17 wherein spraying the cleaning fluid from the nozzle onto the filtering material further comprises spraying the cleaning fluid while the disc-shaped filter member associated with the filtering material rotates.

19. The method of claim 17 wherein two nozzles are operatively connected to the carriage and wherein rotating the guide bar to the cleaning position while the carriage is stopped adjacent to the first disc-shaped filter member further comprises positioning the two nozzles such that each nozzle sprays cleaning fluid onto opposite sides of the filtering material of the first disc-shaped filter member simultaneously.

20. The method of claim 17 wherein two nozzles are operatively connected to the carriage and wherein rotating the guide bar to the cleaning position while the carriage is stopped adjacent to the first disc-shaped filter member further comprises positioning the two nozzles such that the nozzles spray cleaning fluid onto filtering materials of adjacent disc-shaped filter members simultaneously.

21. The method of claim 17 wherein after spraying the cleaning fluid from the nozzle onto the filtering material of the first disc-shaped filtering member and before rotating the guide bar from the cleaning position to the adjustment position, the method further comprises rotating the guide bar to a position disposed closer to a center of the first disc-shaped filter member and spraying the cleaning fluid from the nozzle onto the filtering material.

* * * * *